United States Patent [19]
Avramidis

[11] 3,884,089
[45] May 20, 1975

[54] MULTI-SPEED MOTION TRANSMITTING MECHANISM

[75] Inventor: Stellios Antony Avramidis, Greenfield, Ind.

[73] Assignee: FMC Corporation, San Jose, Calif.

[22] Filed: Apr. 19, 1974

[21] Appl. No.: 462,284

Related U.S. Application Data

[62] Division of Ser. No. 294,410, Oct. 2, 1972, Pat. No. 3,845,666.

[52] U.S. Cl............................................. 74/217 C
[51] Int. Cl.............................................. F16h 9/04
[58] Field of Search.................................. 74/217 C

[56] References Cited
UNITED STATES PATENTS
3,610,062   10/1971   Hoff................................. 74/217 C Primary Examiner—Leonard H. Gerin
Attorney, Agent, or Firm—C. E. Tripp; J. F. Verhoeven

[57] ABSTRACT

A two-speed motion transmitting mechanism is disclosed in which an input shaft has an input sprocket and the inner portion of a centrifugal clutch mounted thereon. The input sprocket is connected by a first endless chain to a sprocket mounted on an overrunning clutch which, in turn, is mounted on an auxiliary shaft. A second endless chain connects a sprocket mounted on the outer portion of said centrifugal clutch, which, in turn, has an output shaft extending centrally therefrom. Initially, the drive from the input shaft is effected through the first and second chain and the outer portion of the centrifugal clutch to the output shaft. After a predetermined speed is reached, the centrifugal clutch engages and the drive from the input shaft is effected directly through the centrifugal clutch to the output shaft.

4 Claims, 2 Drawing Figures

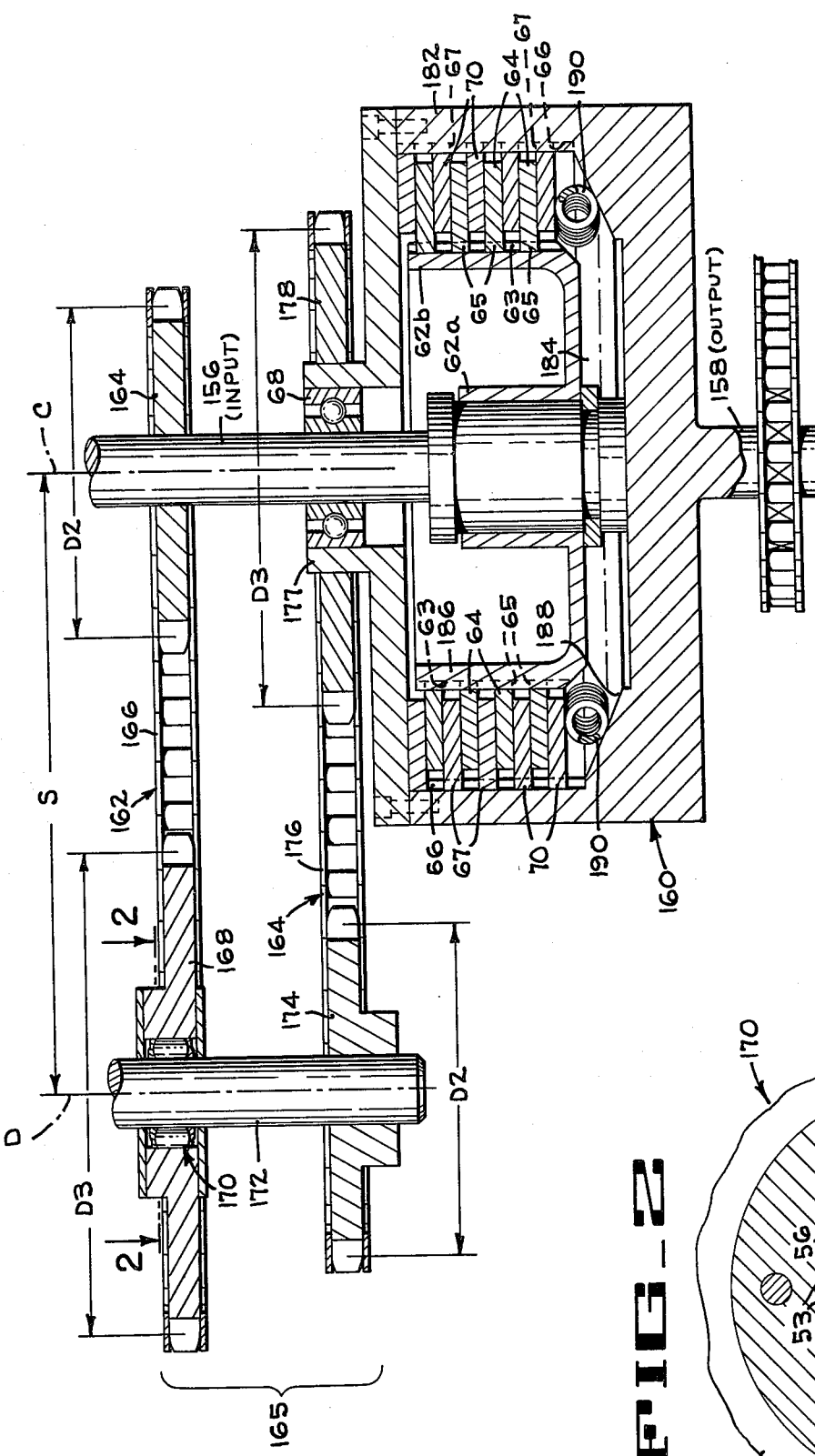

3,884,089

MULTI-SPEED MOTION TRANSMITTING MECHANISM

This application is a division of the U.S. patent application of S. A. Avramidis, Ser. No. 294,410, filed Oct. 2, 1972, now Pat. No. 3,845,666.

BACKGROUND OF THE INVENTION

The present invention relates to motion transmitting mechanisms, and, more specifically, to multi-speed motion transmitting mechanisms.

Multi-speed motion transmitting mechanisms which will automatically change the speed of an output member in response to the speed of an input member, or in response to the speed of the output member, are well known in the field of mechanical drives. One of the many applications for this type of drive is in power driven vehicles.

In general, one type of prior art two-speed drives consist of an input member, an output member, and at least two drive trains connected in parallel between these members. A centrifugal clutch is insertd in the other drive chain so that at any given speed of operation of the input member (which is connected to the automobile engine), one or the other of the drive trains is connected between the input member and the output member, but not both. The drive trains produce different speed ratios between the input and output member so that initially, when the engine speed is low, the output member is driven, through the drive train having the centrifugal clutch, at a higher speed ratio. At that time, the other drive train is ineffective because the overrunning clutch overruns the output member. When the engine speed is higher, the centrifugal clutch is disengaged to render the drive train with the centrifugal clutch ineffective, and the output member is then driven through the overrunning clutch at a lower speed ratio.

SUMMARY OF THE INVENTION

In the present invention, two motion transmitting trains are provided between an input member and an output member (as in the prior art), but the motion transmitting trains of the present invention are connected in series, not in parallel, between the input member and the output member. Power is transmitted from the input member to the output member through the series connected trains, during only one phase, or speed range, of operation of the engine. In the other phase of operation, the input and output members are connected, but not through either motion transmitting train.

In brief, in the preferred form of the invention an input member, such as a shaft, is mounted coaxially with an output member, which may, for example, be a hub. An auxiliary shaft has an overrunning clutch with a sprocket mounted thereon which is connected by chain to a sprocket on the input member. The auxiliary shaft also has a sprocket mounted directly thereon which is connected by chain to a sprocket on the outer portion of a centrifugal clutch which has a hub defining the output member. The inner portion of the centrifugal clutch is mounted on the input shaft. Thus, there is provided a first motion transmitting train between the input member and the auxiliary member and a second motion transmitting train between the auxiliary member and the output member, the two trains together defining a driving connection between the input member and the output member.

Rotation of the output member is effected by the driving connection between the input member and the output member defined by the two series connected motion transmitting trains while the engine is operated below a predetermined speed. At this time, the output member, which is coaxial with the input member and is rotatable relative thereto, is rotating slower than the input shaft by virtue of the speed reduction in each of the motion transmitting trains which the output member is connected to the input shaft.

After the engine reaches said predetermined speed, the centrifugal clutch, which is normally disengaged, becomes engaged to break the driving connection from the input member to the output member through the two motion transmitting trains and to connect the output member directly to the input member for operation at the same rotary speed as the input member.

In the device disclosed herein, each of the two driving trains, which are connected in series, may produce identical speed ratios. This is advantageous because, in a chain drive, not only are the sprockets of the respective driving trains on the same centers, but the sprockets are also of the same size and will utilize chains of identical length. In the prior art devices, although the sprockets of the respective drive trains were on the same centers, they were not of the same size, nor were the chains of identical length, because different ratios were required of the two parallel motion transmitting trains. Thus, in the prior art devices, it was difficult to fit chains of different length to the identically spaced sprockets of the parallel motion transmitting trains.

Another advantage of the two-speed motion transmitting mechanism of the present invention is that all speed reduction required during one phase of engine operation need not be achieved in one of the motion transmitting trains. Since the two trains are connected in series, and not in parallel, only a portion (as, for example, one-half) of the reduction need be taken in each motion transmitting train. Thus, the motion transmitting mechanism can be more compact than mechanism with parallel trains.

It is therefore one object of the present invention to provide an improved multi-speed motion transmitting mechanism suitable for transmitting motion at desired speed ratios.

It is another object of the present invention to provide a two-speed motion transmitting mechanism in which an output member is driven directly by an input member at one of the speeds.

It is yet another object of the present invention to provide a two-speed motion transmitting mechanism in which two motion transmitting trains, producing like speed ratios, are used.

It is still another object of the present invention to provide a motion transmitting mechanism in which the output member is mounted coaxially with the input member.

BRIEF DESCRIPTION OF THE DRAWINGS

FIG. 1 is a schematic diagram of the motion transmitting mechanism of the present invention.

FIG. 2 is a cross-sectional view taken on the line 2—2 of FIG. 1.

DESCRIPTION OF THE PREFERRED EMBODIMENTS

There is shown in FIG. 1, the motion transmitting mechanism of the present invention in which shaft 156 (on axis C) defines the input shaft for the motion transmitting mechanism and the hub 158 of a centrifugal clutch 160 defines the output member therefor.

There are two motion transmitting trains 162, 164 arrayed in series to define a drive connection 165 between the input member 156 and the output member 158. The first motion transmitting train 162 consists of a sprocket 164 secured to input shaft 156, an endless chain 166, and a sprocket 168. The sprocket 168 is mounted on an overrunning clutch 170 which is mounted on auxiliary shaft 172 (on axis D).

The overrunning clutch 170 has pockets 53 with retainer springs 55 and rollers 56 therein as shown in FIG. 2. The upper surfaces 57 of the pockets (defined by the inner portion of sprocket 168) are inclined to define wedge surfaces. When the sprocket 168 is driven clockwise (as viewed in FIG. 2) relative to shaft 172, or shaft 172 is driven counterclockwise relative to sprocket 168, the rollers 56 become wedged against surfaces 57, and sprocket 168 and shaft 172 become locked for rotation together. When sprocket 168 is driven counterclockwise with respect to shaft 172, or shaft 172 is driven clockwise with respect to sprocket 168, the rollers are freed from the wedge surfaces and relative rotation between the shaft and sprocket can take place.

The second motion transmitting train 164 consists of a sprocket 174 secured to auxiliary shaft 172, and endless chain 176, and a sprocket 178 secured on the hub portion 177 of the outer member 182 of centrifugal clutch 160. Output member 158, which may also be considered a hub, is integral with clutch member 182 and rotates in unison with hub portion 177. The spacing S between sprockets in the respective trains is identical and the diameters D2 and D3 of corresponding sprockets are identical. Since the diameters of the corresponding sprockets of the two trains, and the spacing between the sprockets of the two trains, are identical, the length of the two chains are identical. The ratio R1 of the diameter D2 of the input sprocket to the diameter D3 of the output sprocket of each train is less than one. Therefore, the transmission of motion from shaft 156 to shaft 172 through the first train results in a lower speed for shaft 172 than shaft 156 and the transmission of motion from shaft 172 to output member 158 results in a lower speed for output member 158 compared to auxiliary shaft 172. Hence, the speed of output member 158 is $R1^2$ times the speed of input shaft 156 when the output member is driven through the drive connection 165 defined by the series connected first and second motion transmitting train.

The centrifugal clutch 160 is operated in response to the speed of the outer member 182 of the clutch. The outer member 182 of the clutch forms a unit with hub member 177 and output member 158, and encloses a chamber 184 which houses the inner clutch member 186. The inner clutch member 186 of the clutch 160, which is secured to input shaft 156, consists of a hub 62a and a cup-member 62b with a plurality of angularly spaced longitudinal grooves 63 therein. A plurality of annular longitudinally spaced plates 64 have inner projections 65 which are received in the outer grooves 63 of the hub. The outer member 182 of the clutch 160 consists of a cup-shaped member mounted on shaft 156 through anti-friction bearing 68. The cup-shaped member has a plurality of angularly spaced longitudinal grooves 66 in the inner surface thereof. A plurality of annular longitudinally spaced plates 70 have outer projections 67 which are received in grooves 66. The plates 70 mesh in staggered relation with the plates 64 of the clutch member 62. The outer member has an inner inclined surface 188 against which a circular spring 190 seats. Normally, while the inner member 186 is rotating below a predetermined speed, the tension in the spring pulls the spring radially inwardly, and the clutch plates of the clutch are disengaged.

At low engine speed, because the two members of centrifugal clutch 160 are disengaged, drive of the output member 158 (and hence member 182) occurs through the first motion transmitting train 162, overrunning clutch 170, auxiliary shaft 172, and the second motion transmitting train 164.

When the engine speed is increased to increase the speed of the outer member 182 of centrifugal clutch 160 to a predetermined speed, the spring 190 moves outwardly, pressing the clutch plates together by virtue of the camming action of wedge surface 188, to engage the inner member 186 of the centrifugal clutch with the outer member thereof. When this engagement occurs, the drive of the output member is effected directly from input shaft 156 to inner clutch member 186, outer clutch member 182, to output member 158. The overrunning characteristic of clutch 170 frees the sprocket 168 from auxiliary shaft 172 and the drive trains continue to run, but without pulling any load.

Although the best mode contemplated for carrying out the present invention has been herein shown and described, it will be apparent that modification and variation may be made without departing from what is regarded to be the subject matter of the invention.

What is claimed is:

1. A multi-speed motion transmitting mechanism comprising an input member and an output member mounted on a common axis, a centrifugal clutch having two rotatable members, one of said members connected to said output member for rotation therewith and the other of said members connected to said input member for rotation therewith, an auxiliary member spaced from said axis having an overrunning clutch thereon, means connecting said input member to said auxiliary member through said overrunning clutch, means connecting said auxiliary member to said one of said centrifugal clutch members to drive said output member through said overrunning clutch and said auxiliary member when the centrifugal clutch is disengaged, said centrifugal clutch operable to connect the output member directly to the input member for rotation at the same speed as the input member when said centrifugal clutch is engaged.

2. A multi-speed motion transmitting mechanism comprising an input member and an output member mounted on a common axis, a centrifugal clutch having two rotatable members, one of said members connected to said output member for rotation therewith and the other of said members connected to said input member for rotation therewith, an auxiliary member spaced from said axis having an overrunning clutch thereon, an endless member connecting said input member to said auxiliary member through said overrunning clutch, an endless member connecting said auxiliary member to said one of said centrifugal clutch members to drive said output member through said overrunning clutch and said auxiliary member at a different speed than said input member when the centrifugal clutch is disengaged, said centrifugal clutch operable to connect the output member directly to the input member for rotation at the same speed as the input member when said centrifugal clutch is engaged.

3. A multi-speed motion transmitting mechanism comprising an input member and an output member mounted on a common axis, a centrifugal clutch having two rotatable members, one of said members connected to said output member for rotation therewith and the other of said members connected to said input member for rotation therewith, an auxiliary member spaced from said axis having an overrunning clutch thereon, means including a chain and sprockets mounted on said input member and said overrunning clutch, respectively, to define a first drive train connecting said input member to said auxiliary member through said overrunning clutch, means including a chain and sprockets mounted on said auxiliary shaft and said one centrifugal clutch member, respectively, to define a second drive train connecting said auxiliary member to said one of said centrifugal clutch members, said first and second drive trains arranged to drive said output member through said overrunning clutch and said auxiliary member at a different speed than said input member when the centrifugal clutch is disengaged, said centrifugal clutch operable to connect the output member directly to the input member for rotation at the same speed as the input member when said centrifugal clutch is engaged.

4. A multi-speed motion transmitting mechanism comprising an input member and an output member mounted on a common axis, a centrifugal clutch having two rotatable members, one of said members connected to said output member for rotation therewith and the other of said members connected to said input member for rotation therewith, an auxiliary member spaced from said axis having an overrunning clutch thereon, means defining a first drive train connecting said input member to said auxiliary member through said overrunning clutch, means defining a second drive train connecting said auxiliary member to said one of said centrifugal clutch members, both of said drive trains identical and each comprising two sprockets of different size and a chain trained around said sprockets, said first and second drive trains operable to drive said output member through said overrunning clutch and said auxiliary member at a different speed than said input member when the centrifugal clutch is disengaged, said centrifugal clutch operable to connect the output member directly to the input member for rotation at the same speed as the input member when said centrifugal clutch is engaged.

* * * * *